UNITED STATES PATENT OFFICE.

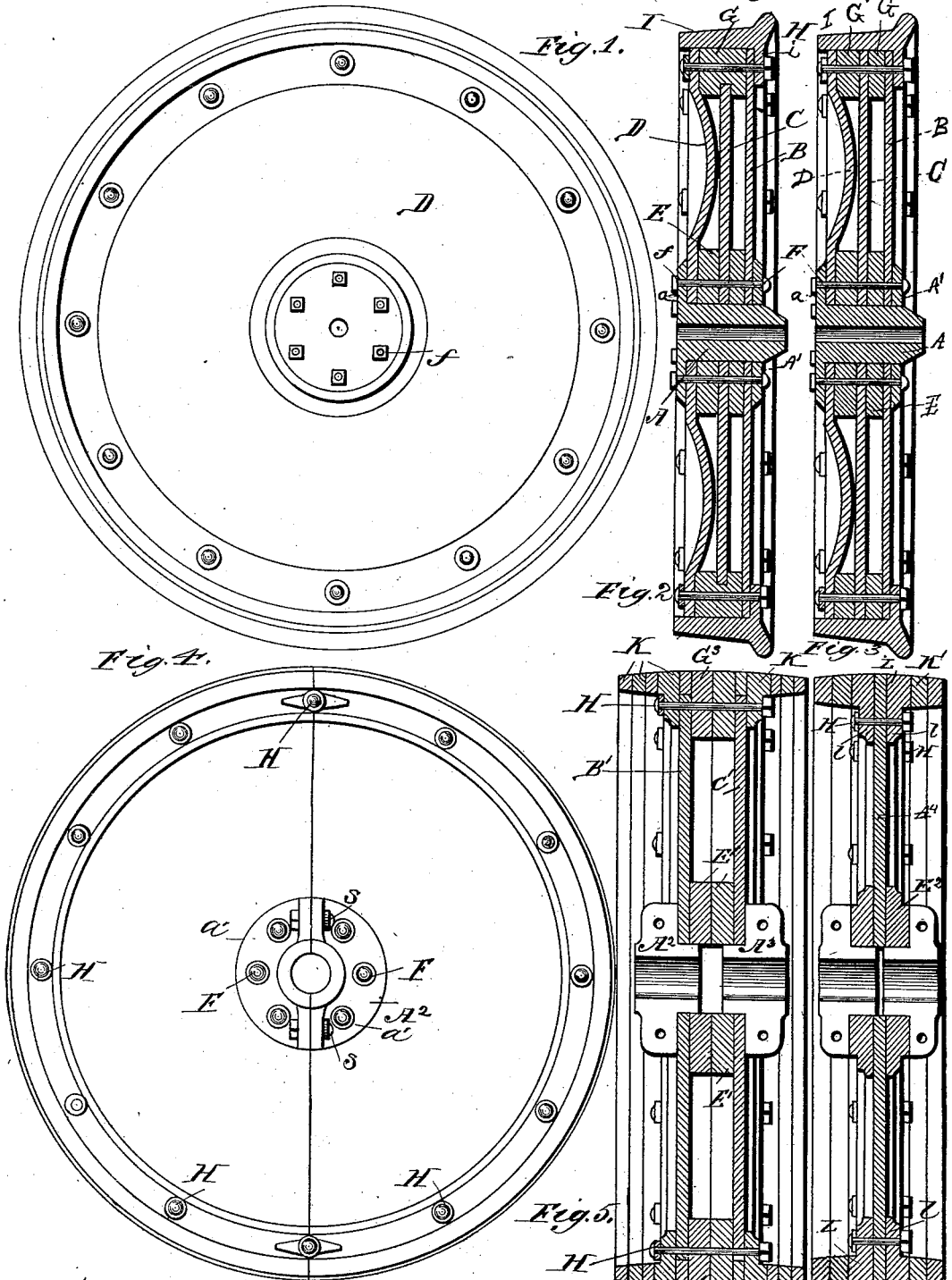

JOSEPH LATHROP, OF CHICAGO, ILLINOIS, AND AHIRA TYRRELL, OF KENDALL, MICHIGAN.

PULLEY.

SPECIFICATION forming part of Letters Patent No. 367,984, dated August 9, 1887.

Application filed January 29, 1887. Serial No. 225,859. (No model.)

*To all whom it may concern:*

Be it known that we, JOSEPH LATHROP, of Chicago, State of Illinois, and AHIRA TYRRELL, of Kendall, in the county of Van Buren, State of Michigan, have invented certain new and useful Improvements in Pulleys or other Wheels, of which we do declare the following to be a full, clear, and exact description, reference being had to the accompanying drawings, forming part of this specification.

Our present invention has relation to the improvement of that class of pulleys or other wheels the bodies of which are composed, preferably, of disks of veneer provided with a central metal hub bolted thereto and with an exterior rim or tire firmly bolted to the outer periphery of the disks; and particularly does our invention relate to the improvement of the construction of wheel or pulley set forth in Letters Patent No. 325,251, granted to us September 1, A. D. 1885, in which Letters Patent the veneer disks comprising the body of the wheel were bolted to flanges formed upon the central hub, an open space being left between the disks adjacent the hub. By our present invention the disks are bolted to the hub; but between the disks at a point adjacent the hub brace-blocks are provided, which fill the space between the veneer disks at such point and afford a more secure bearing for said disks than would be possible were such blocks omitted.

Our invention consists, primarily, in providing the body of a wheel or pulley with brace-blocks placed between the veneer disks adjacent to the periphery of the hub to which said disks are bolted.

Our invention also consists in certain other features of construction hereinafter described, illustrated in the accompanying drawings, and particularly pointed out in the claims at the end of this specification.

Figure 1 is a view in side elevation, and Fig. 2 a view in vertical transverse section, of a car-wheel embodying one form of our invention. Fig. 3 is a view in vertical transverse section of a car-wheel embodying a slightly-modified form of the invention. Fig. 4 is a view in side elevation, and Fig. 5 a view in vertical transverse section, of a belt-pulley embodying our invention. Fig. 6 is a view in vertical transverse section of a belt-pulley of modified construction.

Referring to Figs. 1, 2, and 3 of the drawings, A designates the central hub of the car-wheel, which is provided at its outer end with the flange $a$, formed integral therewith. Between this flange $a$ and the loose clamping-ring A', that encircles the hub near its inner end, are firmly held the several disks, B, C, and D, that bear against the periphery of the hub, and the intermediate brace blocks or rings, E, by means of the bolts F, which pass through the several parts and are provided at their threaded ends with nuts $f$, by means of which the clamping-ring can be firmly drawn toward the flange $a$ in order to clamp or bind the several disks and the intermediate brace blocks or rings.

The several disks composing the body of the wheel are formed each of thin sheets of wood veneer firmly glued together with their grains crossed, as in our former patent, the disks B and C being by preference flat and extending in the same plane, while the outer disk, D, is formed with the annular depression intermediate the periphery and hub of the wheel.

Between the disks B and C in the construction shown in Fig. 2 a single brace-block, G, is placed, in which block is formed an annular groove to receive the edge of the central disk, C, and through which block and the disks B and D pass the clamping-bolts H, which pass through the flange $i$ of the tire or rim I, and firmly bind the outer edges of the disks upon the brace-block and hold the tire or rim I of the wheel securely in place upon the periphery of the wheel.

In the modified construction shown in Fig. 3 the outer brace-block between the disks that compose the body of the wheel is divided to form the sections G and $G^2$, and between these sections is extended the intermediate disk, C, which bears against the inner face of the tire I. Our purpose in placing the brace-blocks between the several disks at their bearing point upon the hub is to render the body of the wheel at such point of such broad and firm construction as if the body of the wheel at such point were of a solid piece, and at the same time to permit the several disks to be securely forced and bound together by means of a single set of clamping-bolts. The brace-blocks at the outer edge of the disks serve not only to properly hold the disks separate from each other, but also afford a broad and firm periphery against which the tire of the wheel may bear, and enables the disks to be securely clamped against the inwardly-projecting flange of the tire. Our purpose in employing a central disk, C, between the outer disks, B and D, is to offer a more direct resistance to the vertical strain upon the wheel when traveling in straight line upon a railway-car track, and our purpose in providing the outer disk, D, with the annular groove is to brace this disk more securely against the strain which is thrown upon it when the outer flanges of the tire are forced against the rails, and also to give to the wheel more elasticity than it would have were such disk perfectly flat.

In Figs. 4 and 5 of the drawings, in which our invention is shown as applied to a split pulley, the hub of the pulley consists of the separate parts $A^2$ and $A^3$, adapted to be clamped together by the bolts $s$ when the pulley is placed upon the shaft. Each of these sections $A^2$ and $A^3$ of the hub is provided with a semi-annular flange, $a'$, and between these flanges $a'$ are clamped the disks B' and C' and the brace-blocks E' by means of the bolts F. The sectional hub formed of the parts $A^2$ and $A^3$ is of a length inside the flanges $a'$ less than the combined thickness of the disks B' and C' and the brace-blocks E', so that when the brace-blocks and disks are clamped between the flanges $a'$ of the hub the body of the hub will form a secure bearing for the disks and brace-blocks. In this construction the body of the wheel or pulley is formed of but two flat disks, one at each side of the center, so that in the pulley the strain from periphery to hub is uniform.

Between the outer edges of the disks B' and C' are placed the brace-blocks $G^2$, which in this construction serve also to form part of the rim I of the wheel, and the brace-blocks and the disks are clamped together and to the rim of the wheel by means of the bolts H, which pass through these parts and also through the flanges of the strips K, that form part of the rim of the wheel and project inwardly therefrom. The rim of the wheel in this construction is formed of a number of annular rings composed of thin sheets of cross-grain veneers firmly glued together.

In the construction shown in Fig. 6 the hub is formed of two sections, as already described, and but a single disk is employed to form the body of the wheel. In order, however, to give to this disk a broad firm bearing upon the hub, there is provided the brace-blocks $E^2$, one on either side of the disk, through which pass the clamping-bolts, which firmly unite these brace-blocks and the disk with the flanges $a'$ of the hub. In this construction a single disk, A', is extended through and forms part of the rim K' of the pulley, which rim, like that shown in Fig. 5, is composed of annular rings formed, by preference, of cross-grain veneer, and the disk is firmly clamped to the ring by means of the bolts H, which pass through the inwardly-projecting flanges $l$ of the rings L, that adjoin the disk and form part of the rim.

Having thus described our invention, what we claim as new, and desire to secure by Letters Patent, is—

1. In a wheel or pulley, the combination, with the hub and the disks forming the body, of brace-blocks surrounding the hub and bolted thereto and to the body, substantially as described.

2. In a wheel or pulley, the combination, with the hub having a flange, of the disks comprising the body of the wheel, the intermediate brace-blocks between said disks, and a clamping-ring and bolts for firmly binding said brace-blocks and disks together to form a broad bearing around the hub, substantially as described.

3. In a wheel or pulley, the combination, with the hub and the disks comprising the body of the wheel or pulley, of the brace-blocks encircling the hub, the brace-blocks located between the disks at their peripheries, and suitable bolts for uniting said disks and brace-blocks, substantially as described.

4. In a wheel, the combination, with the hub A, having a flange, $a$, and the clamping-ring A', of wooden disks and brace-blocks intermediate said disks and bearing upon the hub, brace-blocks intermediate said disks and bearing upon the tire, and suitable bolts for connecting the parts, substantially as described.

5. In a wheel, the combination, with the hub, of the body composed of the disks B, C, and D, the intermediate brace-blocks, E, and the intermediate brace block or blocks, G, substantially as described.

6. In a wheel, the combination, with the hub, of a body composed of wooden disks, the outer disk having an annular depression between its rim and center, and suitable brace-blocks between the disks at the hub and periphery, substantially as described.

JOSEPH LATHROP.

Witnesses for J. Lathrop:
JAMES H. PEIRCE,
FRANK L. DOUGLAS.

AHIRA TYRRELL.

Witnesses for A. Tyrrell:
JAMES H. PEIRCE.
GEO. P. FISHER, Jr.